(12) United States Patent
Garzon

(10) Patent No.: US 7,578,396 B1
(45) Date of Patent: Aug. 25, 2009

(54) DISC SCREEN APPARATUS

(75) Inventor: Jaime A. Garzon, O'Fallon, MO (US)

(73) Assignee: Hustler Conveyor Company, O'Fallon, MO (US)

( * ) Notice: Subject to any disclaimer, the term of this patent is extended or adjusted under 35 U.S.C. 154(b) by 0 days.

(21) Appl. No.: 11/873,199

(22) Filed: Oct. 16, 2007

(51) Int. Cl.
*B07C 5/12* (2006.01)
*B07B 13/00* (2006.01)

(52) U.S. Cl. ........................ 209/667; 209/660; 209/664; 209/666

(58) Field of Classification Search ................ 209/667, 209/660, 664, 666
See application file for complete search history.

(56) References Cited

U.S. PATENT DOCUMENTS

| | | | |
|---|---|---|---|
| 1,679,593 A * | 8/1928 | Williamson et al. ......... | 209/672 |
| 1,699,718 A | 1/1929 | Robins | |
| 2,860,766 A | 11/1958 | Welter | |
| 4,653,648 A * | 3/1987 | Bielagus ..................... | 209/672 |
| 4,972,960 A * | 11/1990 | Bielagus ..................... | 209/672 |
| 5,051,172 A * | 9/1991 | Gilmore ..................... | 209/672 |
| 5,152,402 A * | 10/1992 | Matula ........................ | 209/672 |
| 5,163,564 A * | 11/1992 | Matula ........................ | 209/672 |
| 5,257,699 A * | 11/1993 | Fricker et al. ............... | 209/672 |
| 5,450,966 A | 9/1995 | Clark et al. | |
| 5,762,177 A * | 6/1998 | Baker et al. ............ | 198/781.07 |
| 5,960,964 A * | 10/1999 | Austin et al. ................ | 209/672 |
| 6,076,684 A | 6/2000 | Bollegraaf | |
| 6,092,968 A * | 7/2000 | Lanham et al. ............. | 411/431 |
| 6,149,018 A | 11/2000 | Austin et al. | |
| 6,250,477 B1 | 6/2001 | Swanink | |
| 6,250,478 B1 | 6/2001 | Davis | |
| 6,318,560 B2 * | 11/2001 | Davis ......................... | 209/672 |
| 6,371,305 B1 * | 4/2002 | Austin et al. ................ | 209/672 |
| 6,460,706 B1 * | 10/2002 | Davis ......................... | 209/672 |
| 6,648,145 B2 | 11/2003 | Davis et al. | |
| 7,261,209 B2 * | 8/2007 | Duncan et al. .............. | 209/672 |
| 2001/0004059 A1 * | 6/2001 | Davis ......................... | 209/672 |
| 2002/0090156 A1 * | 7/2002 | Kai et al. .................... | 384/477 |
| 2003/0062294 A1 | 4/2003 | Davis et al. | |
| 2003/0116486 A1 | 6/2003 | Davis | |
| 2004/0079684 A1 | 4/2004 | Davis et al. | |
| 2006/0180524 A1 * | 8/2006 | Duncan et al. .............. | 209/672 |

* cited by examiner

*Primary Examiner*—Patrick H Mackey
*Assistant Examiner*—Terrell H Matthews
(74) *Attorney, Agent, or Firm*—Polster Lieder Woodruff and Lucchessi, L.C.

(57) ABSTRACT

A disc for releasable attachment with a shaft of a disc screen apparatus. The disc separates into two opposed halves at a parting line having offset portions. The disc includes a hub with a bore for receiving a rotating shaft. The hub is radially offset about a center axis of the disc to generally correspond with the offset portions of the parting line. The offset hub distributes rotational forces on the disc to prevent separation of the discs during operation.

20 Claims, 3 Drawing Sheets

DISC SCREEN APPARATUS

CROSS-REFERENCE TO RELATED APPLICATIONS

Not Applicable.

STATEMENT REGARDING FEDERALLY SPONSORED RESEARCH

Not Applicable.

BACKGROUND OF THE INVENTION

The invention relates to the field of disc screen apparatus for material separating equipment and, more particularly, to a removable disc screen apparatus that improves performance and reduces maintenance.

Material separating systems, such as a disc screen apparatus, typically utilize disc screens to separate or classify particular items from large flows of materials. The disc screen apparatus generally includes a frame supporting a plurality of rotating shafts. A plurality of discs mounted to the shafts form a screen with openings that allow predetermined sizes of articles to fall through the screen. Articles larger than the openings are carried by rotation of the discs across the screen and dispatched.

Due to the heavy flow of materials across the screen, discs wear quickly and require frequent and time-consuming maintenance and replacement. Many current disc designs are slidably engaged with the shaft and are fixed in the desired positions by spacers and fasteners. Consequently, replacement of this type of disc requires disassembly of the shaft and discs from the frame.

Some disc designs separate into multiple sections, such as halves, to removeably attach to the shafts. These disc designs use a horizontal parting line across the midsection of the disc and are secured together with fasteners. However, the rotational forces placed on the disc by the shaft torque stretch and separate the disc halves along the parting line. For example, as torque is transferred from the shaft to the disc, one side of the disc is compressed along the parting line, while the other half of the disc is tensioned, thereby pulling the two halves away from each other to create a gap. Thus, articles become caught in the resulting gap in the disc.

Therefore, what is needed is a removable disc that does not separate during operation.

DESCRIPTION OF THE DRAWINGS

In the accompanying drawings which form part of the specification.

Corresponding reference numerals indicate corresponding parts throughout the several figures of the drawings.

DETAILED DESCRIPTION

Figure 1:
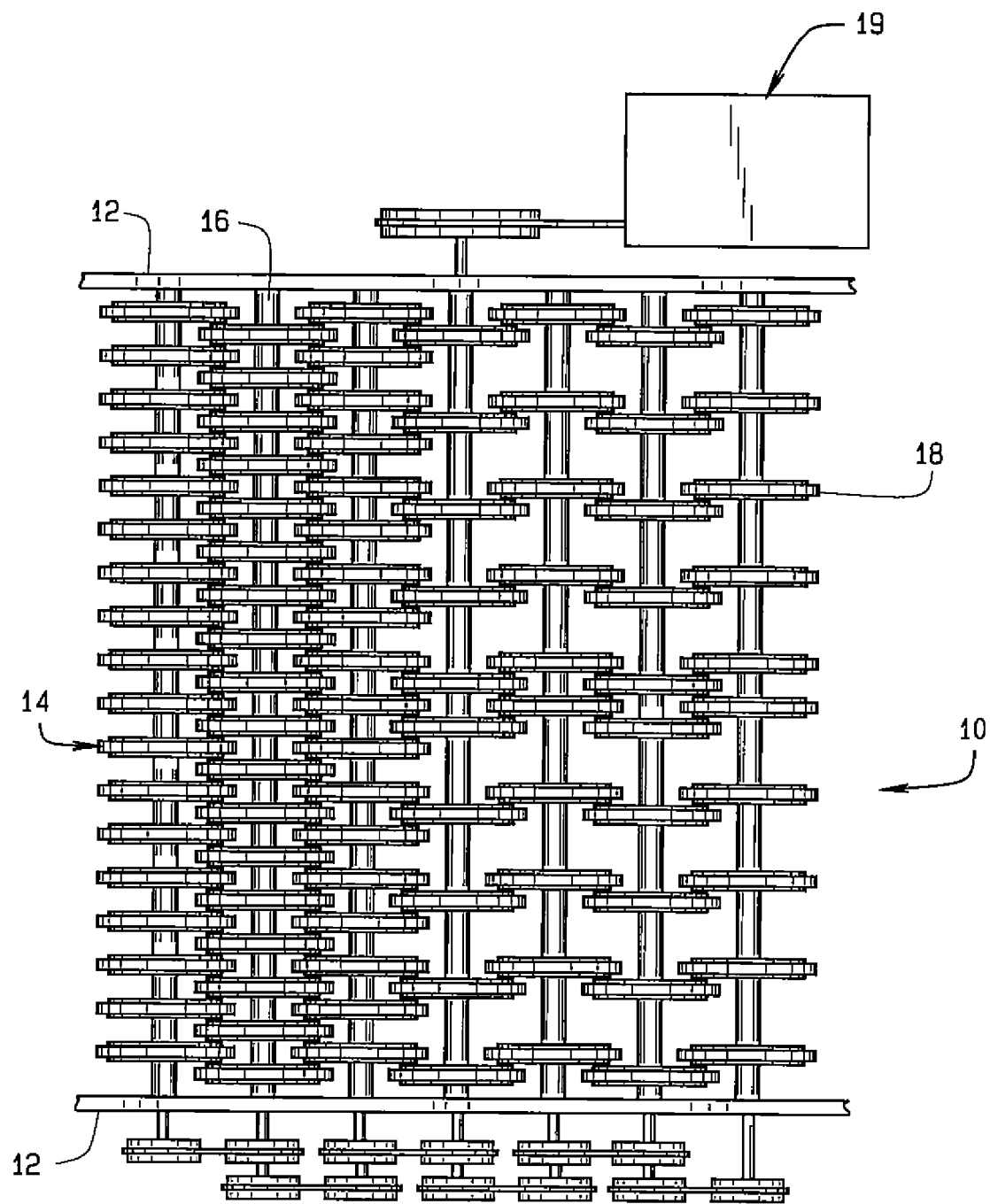
FIG. 1 is a plan view of a disc screen apparatus.

The following detailed description illustrates the invention by way of example and not by way of limitation. The description clearly enables one skilled in the art to make and use the invention, describes several embodiments, adaptations, variations alternatives, and uses of the invention, including what is presently believed to be the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

As shown in FIGS. 1-6, a disc screen apparatus 10 comprises a frame 12 that supports a screening bed 14. The screening bed 14 comprises a plurality of rotating parallel shafts 16 of generally rectangular perimeter and similar length. Each shaft 16 supports a plurality of screen discs 18 in a generally staggered arrangement, which are rotated in unison in the same direction by a drive mechanism 19. As mixed materials pass over the screening bed 14, articles of a predetermined size drop through openings of the screening bed 14 as defined by the discs 18. Articles too large to pass through the openings are dispatched at the end of the screening bed 14.

Figure 2:
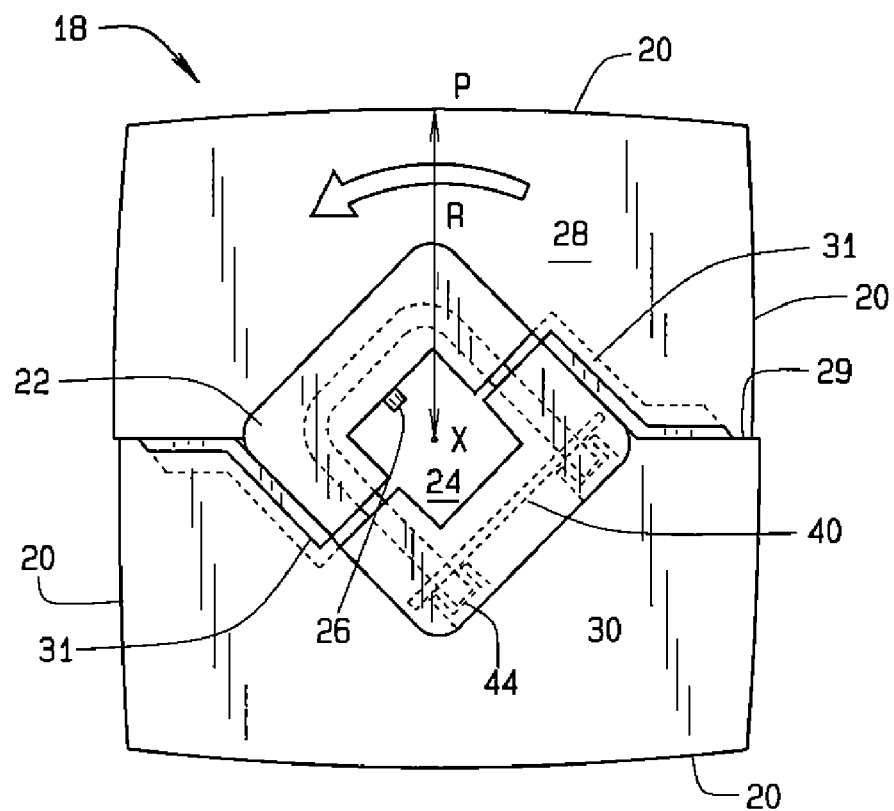
FIG. 2 is a front view of a disc.
Figure 3:
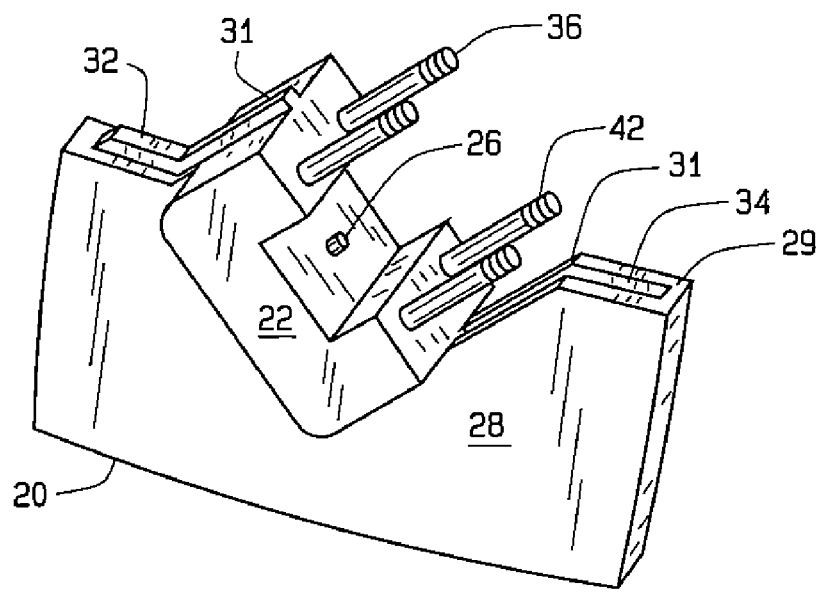
FIG. 3 is a perspective view of a male half of the disc.
Figure 4:
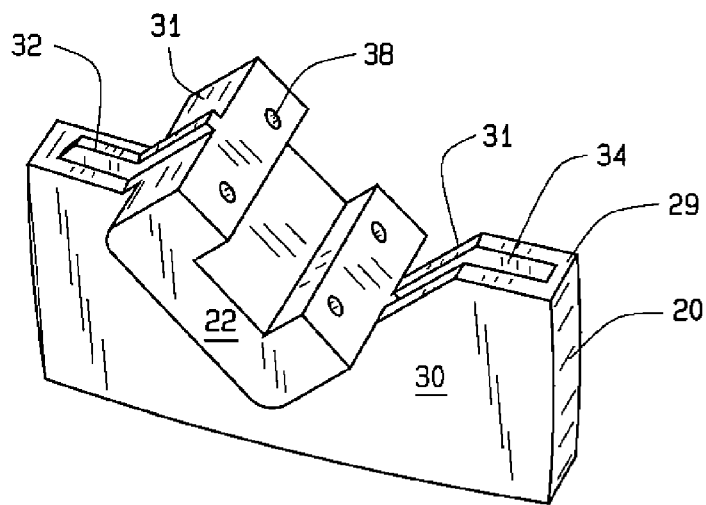
FIG. 4 is a perspective view of a female half of the disc.
Figure 5:
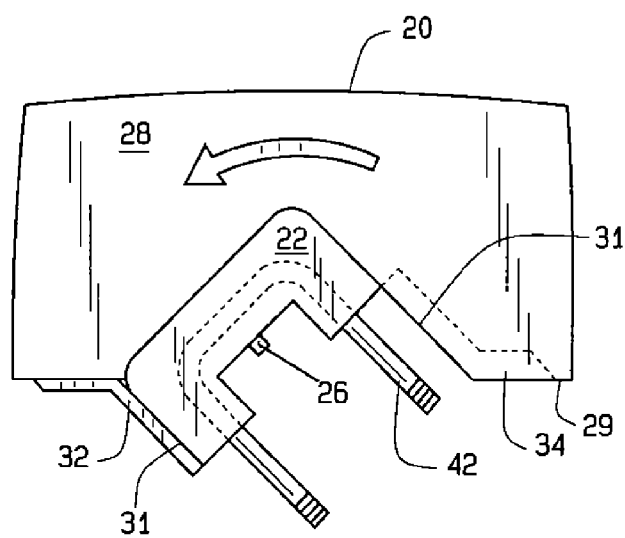
FIG. 5 is a side view of the male half of the disc.
Figure 6:
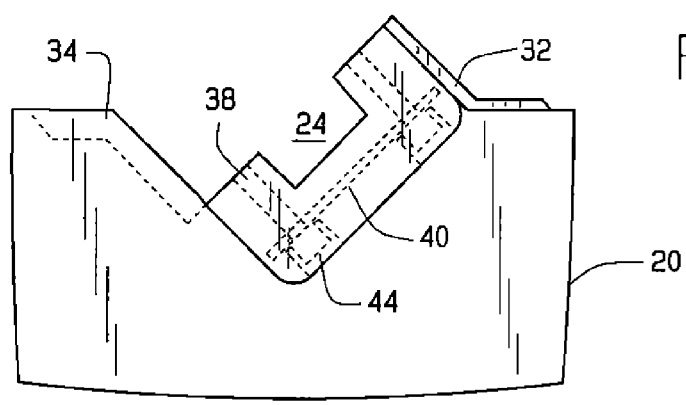
FIG. 6 is a side view of the female half of the disc.

Each disc 18 is generally rectangular having a perimeter divided into four arcuate outer edges 20 with the degree of curvature of each edge 20 being substantially the same (FIG. 2). Preferably, the curvature of each edge 20 can be characterized as having a radius (R) of about 4 ft and $4^{11}/_{16}$ in. with the midpoint (P) of the edge 18 measuring about $5^{3}/_{8}$ in. from the disc center axis (X). Those skilled in the art will recognize that the edges 20 can comprise one of a multitude of profiles, including straight curved, nonlinear, rectilinear, curvilinear, or combinations thereof. In addition, the disc 18 can define more or less than four edges, including, but not limited to three and five edges.

A hub 22 extends axially from both faces of the disc 18, the hub 22 defining a generally rectangular bore 24 for receiving and securing to the shaft 16. The orientation of the hub 22 and bore 24 are offset about the center axis X approximately 45° from the orientation of the edges 20 and a parting line 29 (FIG. 2). A locating pin 26 located within the bore 24 mate with a corresponding hole within the shaft 16 to position the disc 18 at designated locations along the shaft 16. In this way, a plurality of discs 18 can be installed and replaced along the shaft 16 while accurately maintaining their predetermined positions along the shaft 16. While the bore 24 can be of any shape, the shape should generally correspond with the shape of the shaft 16, so that the bore 24 can receive the shaft 16.

The disc 18 separates along the parting line 29 into two generally similar opposed halves, a male disc half 28 and a female disc half 30, generally along a longitudinal axis of the hub 22, which define an inner edge having offset portions 31 substantially corresponding with the offset of the hub 22. Each disc half 28 and 30 includes a tongue portion 32 and a groove portion 34 along the inner edge that mate with a corresponding tongue portion 32 or groove portion 34 on the reciprocal disc half 28 and 30. U-shaped fasteners 36 embedded within the hub 22 of the male disc half 28 extend to mate with corresponding holes 38 and a retaining plate 40 embedded within the hub 22 of the opposed female disc half 30. When assembled, threaded ends 42 of the U-shaped fasteners 36 extend through the holes 38 and the retaining plate 40 and are secured with nuts 44. In this position, the tongue portions 32 mate with the corresponding groove portions 34, thereby, coupling the male disc half 28 with the female disc half 30 and forming the disc 18. Those skilled in the art will recognize that other types of fasteners can be used, such as other types of mechanical fasteners, or adhesives. Each disc half 28 and 30 is of a unitary construction and made from a single material; preferably urethane, but other materials can also be used, such as wood, ceramic, metal, or other polymeric material.

To install the disc 18, the two halves 28 and 30 are assembled so that they receive the shaft 16 in the hub 22. The locating pin 26 inserts into a corresponding hole in the shaft 16 to position the disc along the shaft 16. The U-shaped fasteners 36 insert through the holes 38 in the opposed hub 30 and couple with the nuts 44 to secure the disc 18 to the shaft 16.

During operation, the shaft transfers torque to the hub 22. The offset of the hub 22, and offset portions 31 of the parting line 29 transfer the torque at an offset (45°) from the remainder of the parting line 29. This arrangement distributes the forces through the disc 18 so that neither side of the disc experiences forces sufficient enough to create a gap at the parting line 29.

Changes can be made in the above constructions without departing from the scope of the invention, it is intended that all matter contained in the above description or shown in the accompanying drawings shall be interpreted as illustrative and not in a limiting sense.

What is claimed is:

1. A disc screen for a disc screen apparatus having a shaft, comprising:
   a first disc half having a first partially offset parting face;
   a second disc half having a second partially offset parting face corresponding to the first partially offset parting face, the second disc half being removeably coupled with the first disc half;
   the first disc half and second disc half being sized and shaped so that when coupled together the two disc halves together define a hub radially offset about a center axis of the disc to generally correspond with the first partially offset parting face and the second partially offset parting face, the hub defining a bore for removably mounting the disc screen on the shaft;
   a tongue extending from at least a portion of the first partially offset parting face;
   a groove formed in the second partially offset parting face, the groove being sized and shaped to seat with the tongue; and
   wherein the first disc half and second disc half removeably mounts on the shaft.

2. The disc of claim 1, further comprising, a locating pin within the bore for mating with a hole in the shaft.

3. The disc of claim 1, further comprising a fastener embedded within at least a portion of hub for securing the first disc half to the second disc half.

4. The disc of claim 1, further comprising four arcuate perimeter edges being radially offset from the hub about a center axis of the disc.

5. The disc of claim 1, wherein the hub is radially offset about the center axis about 45°.

6. The disc of claim 1, wherein each disc half is of unitary construction.

7. A disc screen apparatus, comprising:
   a frame;
   a plurality of shafts supported by the frame;
   a plurality of discs removeably secured to the shafts to form a screening bed, each disc comprising;
   a first disc half having a first parting face with first offset portions;
   a second disc half having a second parting face with second offset portions opposed to the first offset portions;
   a bisected hub extending from respective first disc half and the second disc half, the bisected hub being radially offset about a center axis of the disc to generally correspond with the orientation of the first offset portions and second offset portions, the bisected hub defining a bore sized and shaped for removeably mounting the disc to the shaft;
   a tongue extending from the first disc half along at least a portion of the first parting face;
   a groove formed in the second disc half along at least a portion of the parting face, the groove being sized and shaped to seat with the tongue; and
   wherein the first disc half and second disc half removeably mounts on the shaft.

8. The disc of claim 7, further comprising, a locating pin within the bore for mating with a hole in the shaft.

9. The disc of claim 7, further comprising a fastener embedded within at least a portion of the hub for securing the first disc half to the second disc half two opposed halves.

10. The disc of claim 7, further comprising four arcuate perimeter edges being radially offset from the hub about a center axis of the disc.

11. The disc of claim 7, wherein the hub is radially offset about the center axis about 45°.

12. The disc of claim 1, wherein the first partially offset face and second partially offset face are positioned at an angle sufficient to distribute rotational forces between the first disc half or the second disc half so that neither the first disc half or the second disc half receives forces sufficient enough to create a gap between the first parting face and the second parting face.

13. The disc of claim 7, wherein the first offset portions and second offset portions are positioned at an angle sufficient to distribute rotational forces between the first disc half or the second disc half so that neither the first disc half or the second disc half receives forces sufficient enough to create a gap between the first parting face and the second parting face.

14. A disc for releasable attachment with a shaft of a disc screen apparatus, comprising:
   a first disc half having a first mating surface, the first mating surface defining a first offset portion, a first groove formed in at least a first portion of the first mating surface, a first tongue extending from at least a second portion of the first mating surface, and a first hub half radially offset about a center axis of the disc to generally correspond with the first offset portion; and
   a second disc half having a second mating surface sized and shaped to mate with the first mating surface, the second mating surface defining a second offset portion opposed to the first offset portion, a second tongue extending from at least a first portion of the second mating surface and being sized and shaped to seat with the first groove, a second groove formed in at least a second portion of the second half and being shaped and sized to seat with the first tongue, and a second hub half radially offset about a center axis of the disc to generally correspond with the second offset portion, the second hub half being sized and shaped to mate with the first hub half to define a bore for removeable mounting on the shaft.

15. The disc of claim 14, further comprising, a locating pin within the bore for mating with the shaft.

16. The disc of claim 14, further comprising a fastener embedded within the first hub half for securing the first disc half to the second disc half.

17. The disc of claim 14, further comprising four arcuate perimeter edges being radially offset from the hub about a center axis of the disc.

18. The disc of claim 14, wherein the first hub half and the second hub half are radially offset about the center axis about 45°.

19. The disc of claim 14, wherein the first disc half and the second disc half are of unitary construction.

20. The disc of claim 14, wherein the offset portions are positioned at an angle sufficient to distribute rotational forces between the first disc half or the second disc half so that neither the first disc half or the second disc half receives forces sufficient enough to create a gap at the parting line.

* * * * *